(12) United States Patent
Suguro et al.

(10) Patent No.: US 8,914,136 B2
(45) Date of Patent: Dec. 16, 2014

(54) GAME CONTROL PROGRAM AND GAME DEVICE

(75) Inventors: Takayuki Suguro, Shinagawa-ku (JP); Mitsuhiro Shimano, Ohta-ku (JP)

(73) Assignee: Kabushiki Kaisha Sega, Tokyo (JP)

( * ) Notice: Subject to any disclaimer, the term of this patent is extended or adjusted under 35 U.S.C. 154(b) by 161 days.

(21) Appl. No.: 13/145,745

(22) PCT Filed: Dec. 13, 2009

(86) PCT No.: PCT/JP2009/006826
§ 371 (c)(1),
(2), (4) Date: Jul. 21, 2011

(87) PCT Pub. No.: WO2010/086941
PCT Pub. Date: Aug. 5, 2010

(65) Prior Publication Data
US 2011/0276154 A1    Nov. 10, 2011

(30) Foreign Application Priority Data

Jan. 27, 2009  (JP) .................................. 2009-015008

(51) Int. Cl.
*G06F 19/00*  (2011.01)
*A63F 13/40*  (2014.01)

(52) U.S. Cl.
CPC ............ *A63F 13/10* (2013.01); *A63F 2300/65* (2013.01); *A63F 2300/8029* (2013.01); *A63F 2300/303* (2013.01)
USPC ..................... 700/91; 463/7; 463/8

(58) Field of Classification Search
USPC ......................................................... 700/91
See application file for complete search history.

(56) References Cited

U.S. PATENT DOCUMENTS

2004/0254004 A1   12/2004   Kojima et al.
2007/0060234 A1   3/2007    Yamada et al.

FOREIGN PATENT DOCUMENTS

| EP | 1 486 238 | 12/2004 |
| EP | 1 757 346 | 2/2007 |
| JP | 2000-037558 | 2/2000 |
| JP | 2003-062343 | 3/2003 |
| JP | 2005-000304 | 6/2005 |
| JP | 2006-075299 | 3/2006 |
| JP | 2007-054171 | 3/2007 |
| JP | 2008-161601 | 7/2008 |

OTHER PUBLICATIONS

Street Fighter IV, Jul. 18, 2008/Jul. 7, 2009, PC manual, PC release date.*
Punch-Out!!, Nintendo, 1987, manual.*

* cited by examiner

*Primary Examiner* — Kevin Y Kim
(74) *Attorney, Agent, or Firm* — Jordan and Hamburg LLP

(57) ABSTRACT

Damages include ineffective damage (scratch damage) and effective damage (fixed damage). When scratch damage occurs, an amount Ds corresponding to the scratch damage is stored into a memory. When fixed damage occurs, a vitality parameter Lp is decreased by an amount Df corresponding to the fixed damage. Scratch damage decreases over time. If fixed damage Df occurs in the presence of scratch damage, the vitality parameter Lp is decreased by a total amount of the scratch damage and the fixed damage. Such controls on the vitality parameter diversify the game progress.

10 Claims, 17 Drawing Sheets

Existing scratch damage

Existing scratch damage + fixed damage

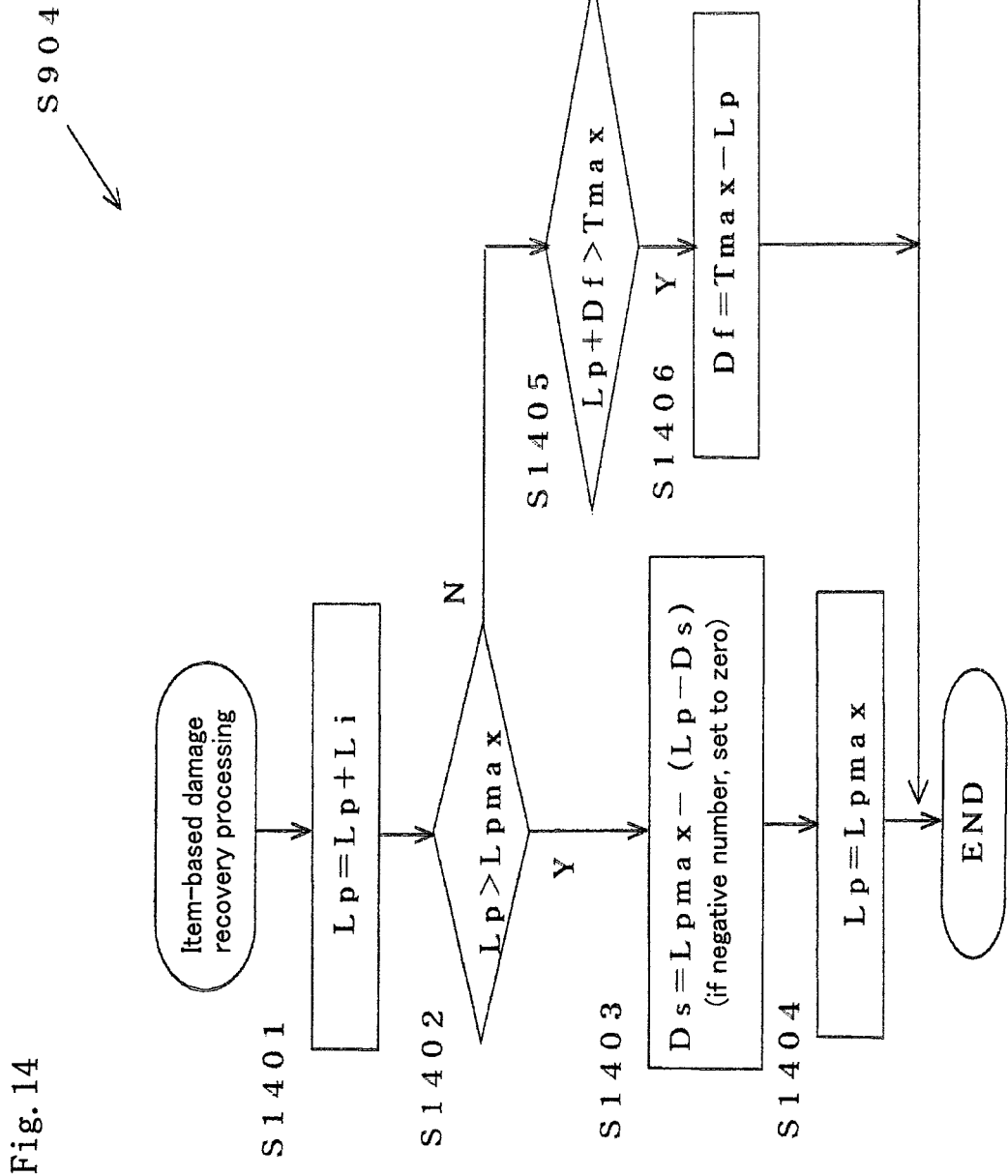

Fig. 15(a) No damage (full vitality parameter)
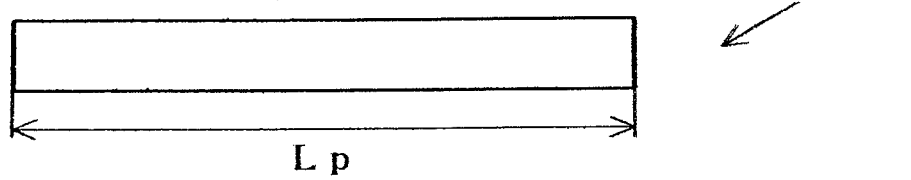
Fig. 15(b) Scratch damage only
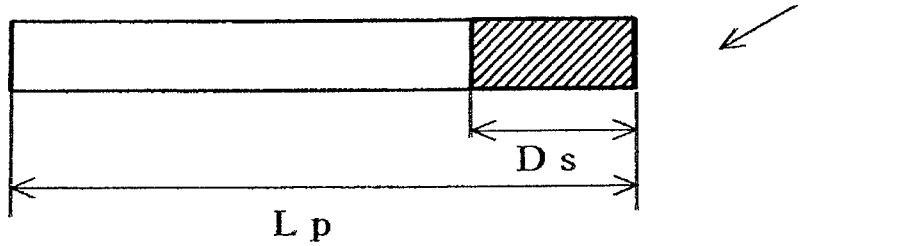
Fig. 15(c) Fixed damage only
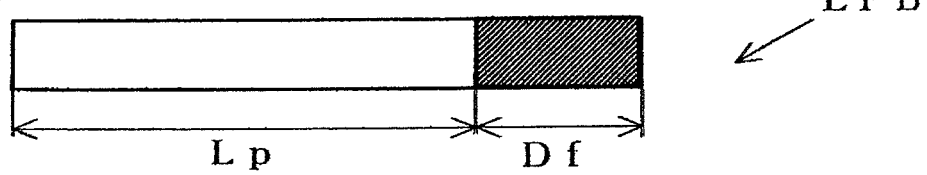
Fig. 15(d) Both damages
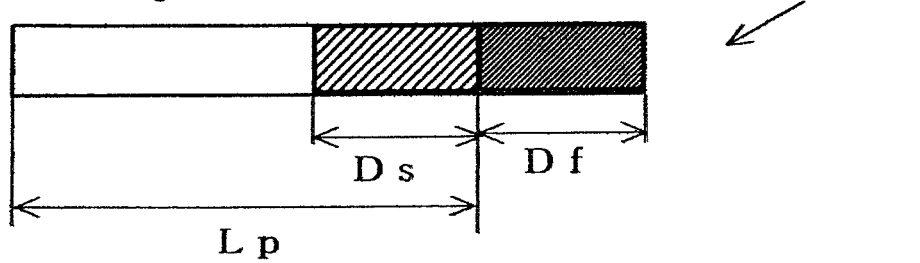

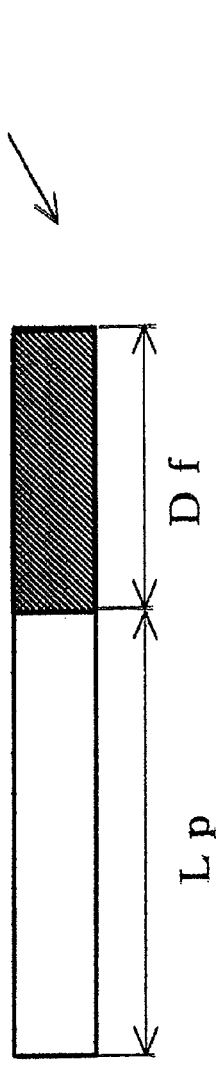
Fig. 16(a) Existing fixed damage + scratch damage
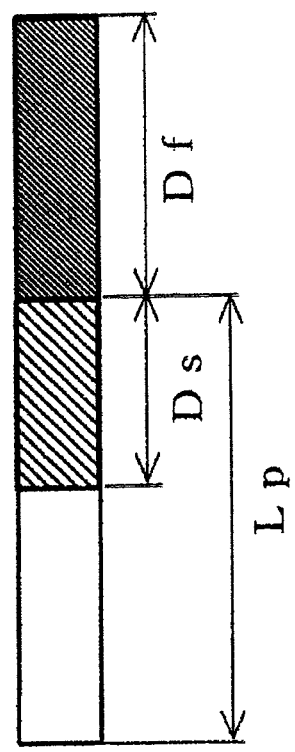
Fig. 16(b) Life parameter decreases by scratch damage Fig. 17(a) Existing scratch damage
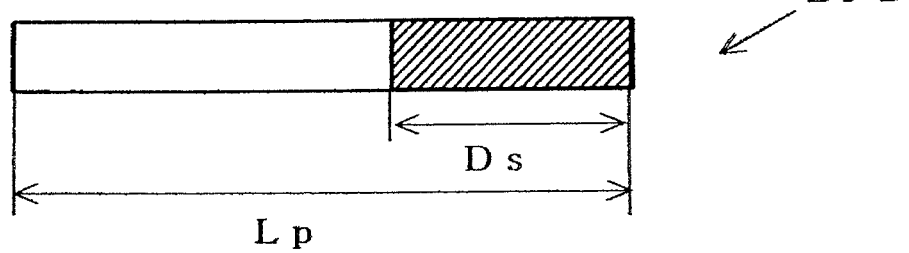
Fig. 17(b) Existing scratch damage + fixed damage
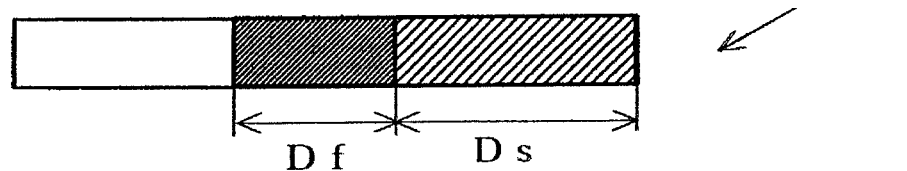
Fig. 17(c) Scratch damage turned into fixed damage
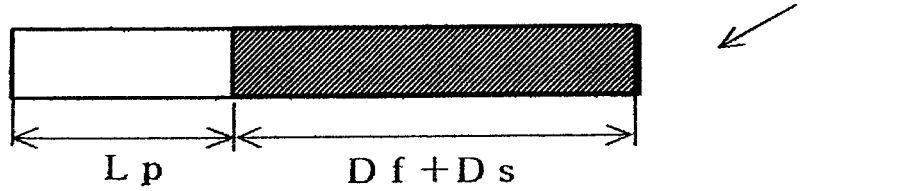

GAME CONTROL PROGRAM AND GAME DEVICE

BACKGROUND OF THE INVENTION

The present invention relates to a game control program for executing a game on a computer and a game apparatus for executing a game, and more particularly to the control of a vitality parameter of a character that appears in the game's virtual space.

Conventionally, in many of the games executing on a computer, characters that appear in the virtual spaces of the games are provided with character capability values such as moving speed and attack power. In some of the known games, each character is provided with a vitality parameter that indicates whether a character action can be made or not, whether the character is operable or not, etc. The vitality parameter is increased or decreased based on the progress of the games and player operations.

JP2005-304 (JP Pat. No. 3699095) discloses a damage control game program which, when restoring a reduced vitality parameter of a damaged character by using various items and the like, gradually increases the vitality parameter to express the state of recovery in a natural manner.

JP2006-230947 discloses a game program which enables a mode of attack that consumes a vitality parameter if a certain condition is satisfied in the time of decreasing the vitality parameter.

SUMMARY OF THE INVENTION

The controls on the vitality parameter described in JP2005-304 (JP Pat. No. 3699095) and JP2006-230947 only include a simple increase and decrease. There is a limitation in the variety of game flows and lack a sense of reality.

The present invention has been achieved in order to solve such a conventional problem, and it is an object thereof to diversify the game progress through control on the vitality parameter.

Means for Solving the Problems

The present invention provides a game control program for making a computer perform game processing in which a player character that acts in response to a player operation and an enemy character attack each other, and a vitality parameter set for the player character is decreased in accordance with damage given to the player character when the enemy character makes an attack on the player character, the computer including control means, a memory, and operation input means, the game control program making the computer function as: means for setting the damage as ineffective damage or effective damage; means for storing an amount of ineffective damage based on the ineffective damage into the memory when the player character is given the ineffective damage; means for restoring the amount of ineffective damage stored in the memory to one decreased by a predetermined amount as time elapses after the player character is given the ineffective damage; and means for calculating, if the player character is given effective damage while the amount of ineffective damage is stored in the memory, a total amount of damage that includes an amount of effective damage based on the effective damage and the amount of ineffective damage in the memory, and decreasing the vitality parameter of the player character based on the amount of damage.

Consequently, effective damage which makes the vitality parameter decrease and ineffective damage which is recoverable can be set to diversify the game progress.

The game control program according to the present invention may further make the computer function as means for setting an attack power parameter for the attack. The means for setting the damage as the ineffective damage or the effective damage may set the damage as the effective damage or the ineffective damage based on the attack power parameter.

Consequently, based on the attack power parameter, effective damage and ineffective damage can be set to diversify the game progress.

The game control program according to the present invention may further make the computer function as: means for generating a point for the player character when the player character makes an attack on the enemy character; and means for changing, when an accumulation of the point reaches a predetermined amount, a state of the player character set into all damages as ineffective damage regardless of the attack power parameter.

This makes it possible to set an advantageous situation where the player can pleasantly enjoy the game.

In the game control program according to the present invention, game processing in which the enemy character attacks the player character and game processing of restoring the ineffective damage over time may be performed on condition that there is an input signal from the operation input means.

Consequently, offense and defense processing in the game and processing as to increasing and decreasing the vitality parameter can be suspended to give time composure to the player.

The game control program according to the present invention may further make the computer function as means for increasing the attack power parameter on condition that an input signal from the operation input means lasts for a predetermined time.

This makes it possible to set an advantageous situation where the player can pleasantly enjoy the game.

The present invention provides a game apparatus including control means, a memory, and operation input means, the control means performing game processing in which a player character that acts in response to a player operation and an enemy character attack each other, and a vitality parameter set for the player character is decreased in accordance with damage given to the player character when the enemy character makes an attack on the player character, the game apparatus including: means for setting the damage as ineffective damage or effective damage; means for storing an amount of ineffective damage based on the ineffective damage into the memory when the player character is given the ineffective damage; means for restoring the amount of ineffective damage stored in the memory to one decreased by a predetermined amount as time elapses after the player character is given the ineffective damage; and means for calculating, if the player character is given effective damage while the amount of ineffective damage is stored in the memory, a total amount of damage that includes an amount of effective damage based on the effective damage and the amount of ineffective damage in the memory, and decreasing the vitality parameter of the player character based on the amount of damage.

Consequently, effective damage which makes the vitality parameter decrease and ineffective damage which is recoverable can be set to diversify the game progress.

According to the present invention, it is possible to diversify the game progress through control on the vitality parameter.

BRIEF DESCRIPTION OF THE DRAWINGS

FIG. 14 is a flowchart showing the item-based damage recovery processing in the processing of FIG. 9.

FIG. 15 is a bar graph of a vitality parameter which displays the vitality parameter, scratch damage, and fixed damage according to the embodiment of the game control program.

FIG. 16 is a diagram showing a state where scratch damage occurs in the presence of fixed damage in the bar graph of the vitality parameter.

FIG. 17 is a diagram showing a state where fixed damage occurs in the presence of scratch damage in the bar graph of the vitality parameter.

DETAILED DESCRIPTION OF THE INVENTION

Then, a best mode for carrying out the present invention will be described with reference to the drawings.

Game Apparatus

Figure 1:
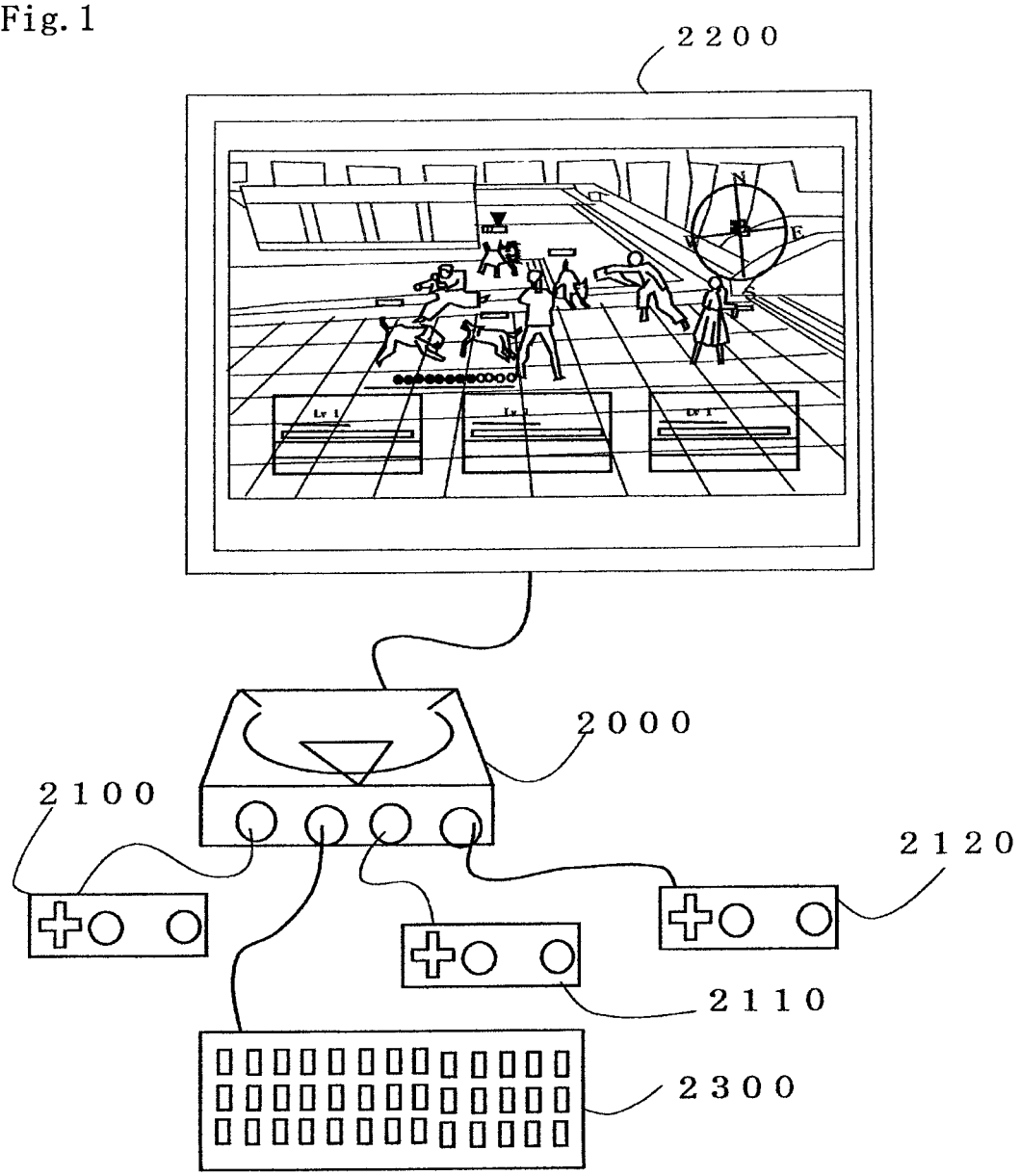
FIG. 1 is a diagram showing the use of an embodiment of the game apparatus according to the present invention.
Figure 2:
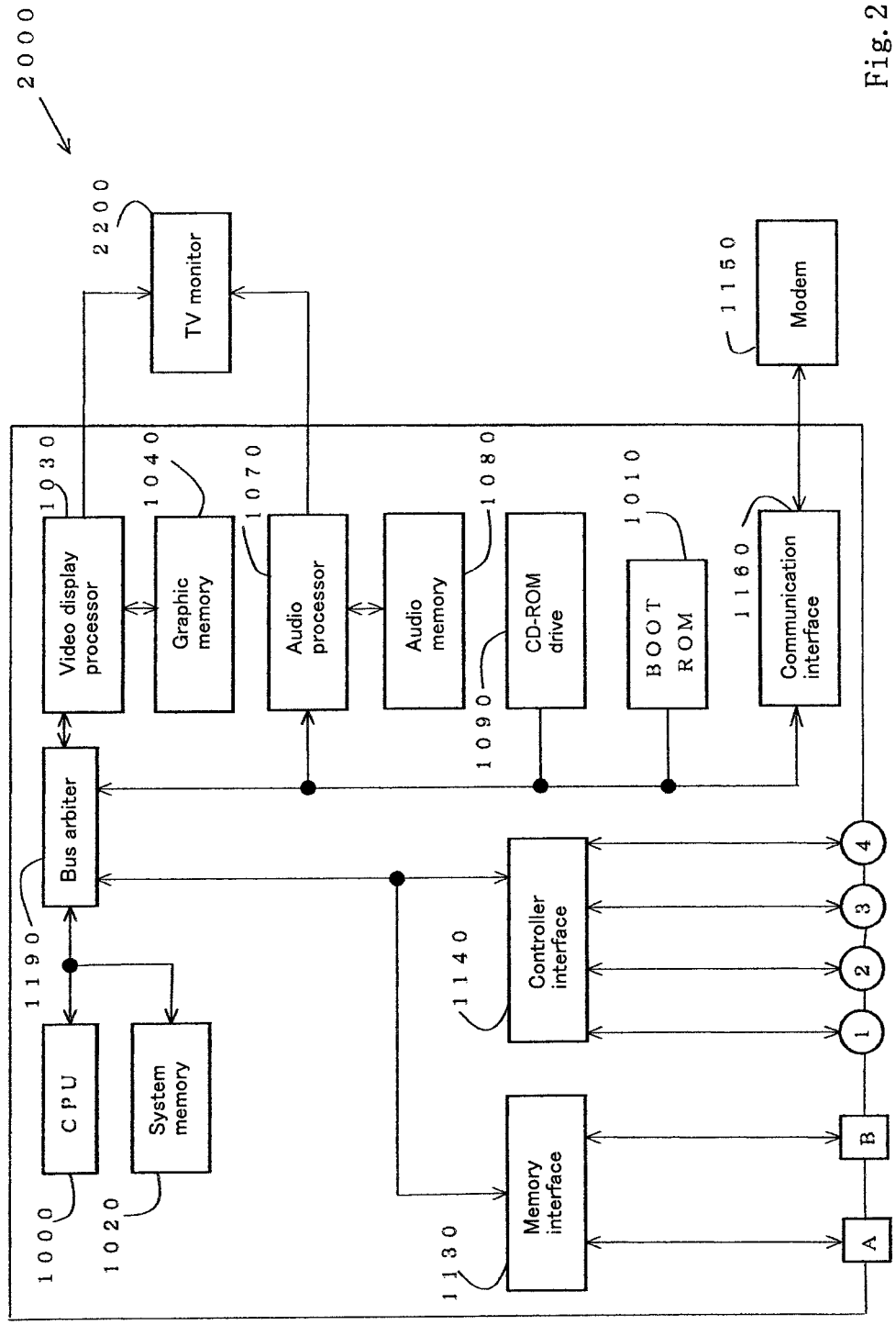
FIG. 2 is a block diagram showing the game apparatus of FIG. 1.
Figure 3:
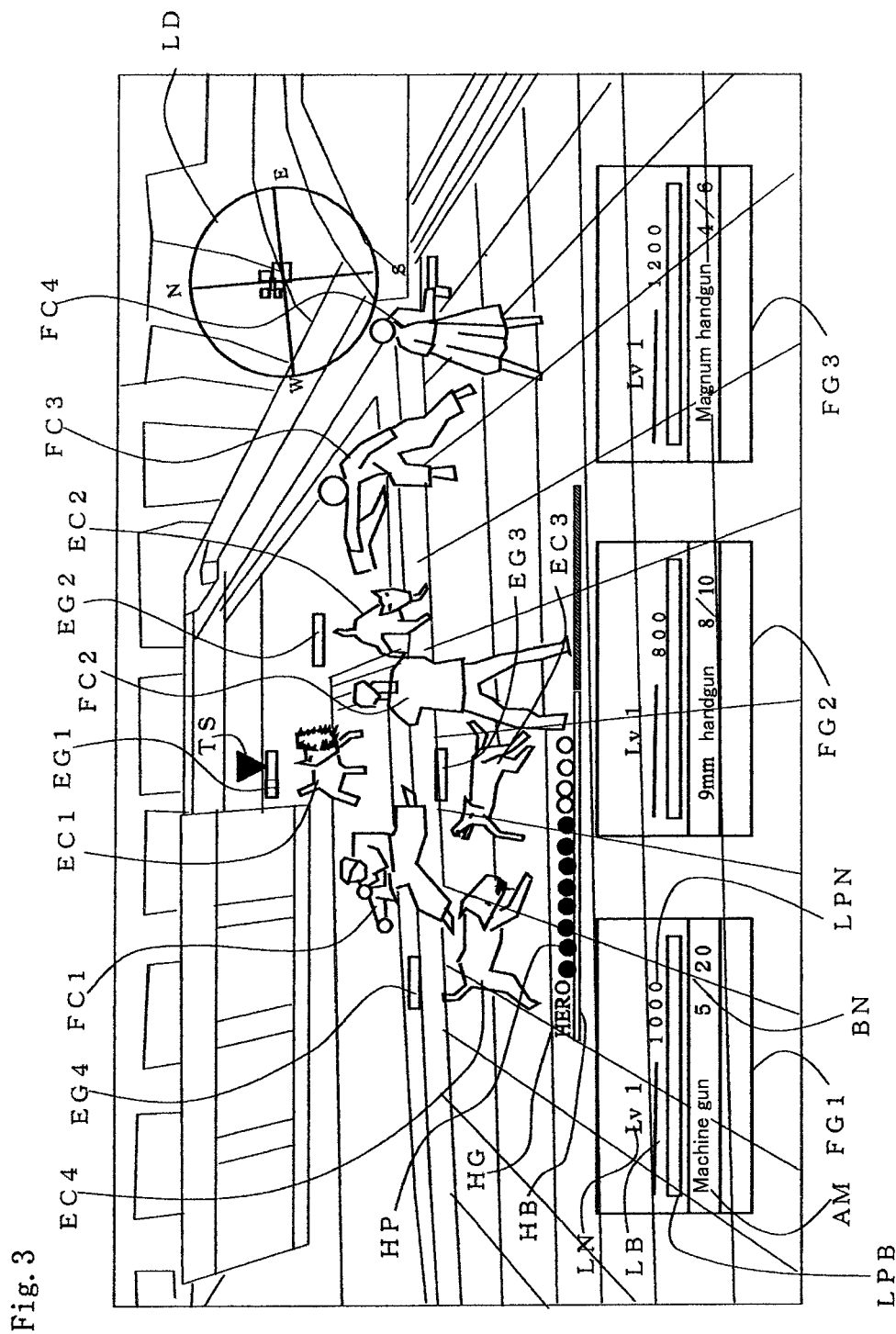
FIG. 3 is a diagram showing a game screen of the game apparatus of FIG. 1.

FIG. 1 is a diagram showing the use of a game apparatus according to the present invention. FIG. 2 is a block diagram showing the game apparatus of FIG. 1. FIG. 3 is a diagram showing a game screen of the game apparatus of FIG. 1.

In FIG. 1, the game apparatus 2000 is connected with operation input means such as controllers 2100, 2110, and 2120 and a keyboard 2300, and a display means such as a TV monitor 2200.

As shown in FIGS. 1 and 3, the display means 2200 displays images of objects that move in the virtual space of the game (for example, player characters FC1 to FC3 and enemy characters EC1 to EC4), images of gauges that indicate vitality parameters of the respective characters (for example, gauges FG1 to FG3 of the player characters FC1 to FC3 and gauges EG1 to EG4 of the enemy characters EC1 to EC4), a hero gauge HG that indicates an advantage of a player character, an image of a radar LD that shows object layout, etc.

The player characters FC1, FC2, and FC3 operate based on input signals of any of the controllers 2100, 2110, and 2120.

The player characters FC1, FC2, and FC3 may be configured to operate based on the input signals of the controllers 2100, 2110, and 2120, respectively, so that a plurality (three) of players independently operate the player characters FC1, FC2, and FC3.

The player characters FC1, FC2, and FC3 operate based on the input signals from the controllers 2100, 2110, and 2120, or based on a predetermined routine. The control is performed by a CPU 1000, which will be described later as related with FIG. 2.

In the meantime, the enemy characters EC1 to EC4 operate based on a predetermined routine. The control is performed by the CPU 1000.

The game executed by the CPU 1000 proceeds with offense and defense between the player characters FC1, FC2, and FC3 vs. the enemy characters EC1 to EC4.

The player characters FC1 to FC3 and the enemy characters EC1 to EC4 are displayed by cooperation of the CPU 1000 with a system memory 1020, a video display processor 1030, and a graphic memory 1040, which will be described later as related with FIG. 2.

In FIG. 2, the game apparatus 2000 includes the CPU 1000 (control means) which controls the entire apparatus, a boot ROM 1010 which contains a program for starting up the game apparatus 2000, and a system memory 1020 which stores a game control program to be executed by the CPU 1000 and values and data of/on parameters, damage, and the like to be described later.

The game apparatus 2000 includes a video processor 1030 which generates and controls images to be displayed, and a graphic memory 1040 which stores source images of images to be generated and the images generated. The video processor 1030 displays the generated images on the display unit 2200.

The game apparatus 2000 includes an audio processor 1070 which generates sound and an audio memory 1080 which stores data on the sound to be generated. The audio processor 1070 generates a digital sound signal based on the data stored in the audio memory 1080, and outputs the sound through speakers or a headphone (not shown).

The game apparatus 2000 includes a CD-ROM drive 1090 or the like as a storage device for program data etc. A game program and data stored in a recording medium are read by the storage device into the system memory 1020, the graphic memory 1040, and the audio memory 1080.

The game apparatus 2000 includes a memory interface 1130, and can read and write memory cards A and B which players have. This makes it possible to register each user's game score, the status of a suspended game, and the like.

The game apparatus 2000 is equipped with a modem 1150 through a communication interface 1160. A plurality of game apparatuses 2000 can execute a network game over a network. The game apparatus 2000 can also acquire various types of information on a game, including the statistics of game scores, the ranking of players, and various events, from a server (not shown).

The game apparatus 2000 includes a controller interface 1140. The controllers 2100, 2110, 2120, and the like are connected to terminals 1 to 4 of the controller interface 1140.

[Vitality Parameter Gauge]

Since the vitality parameter gauges FG1 to FG3 have the same configuration, the gauge FG1 will be described as a representative. The gauge FG1 shows, for example, a numerical value LPN that indicates a vitality parameter Lp (in the diagram, 1000), a bar graph representation LPB of the same, a used weapon AM (in the diagram, machine gun), the number of bullets BN in the weapon (in the diagram, five left out of initial 20), a numerical value LN of the level of capability values of the player character FC1 including the vitality parameter Lp (in the diagram, Lv 1), and a bar graph representation LB of experience points that the player character FC1 has acquired in the game.

[Hero Gauge]

The hero gauge HG indicates the accumulation HGP of points that, for example, the player character FC1 has acquired when the player character FC1 makes a successful attack on any one of the enemy characters EC1 to EC4. The accumulated points HGP are displayed in the form of a bar graph HB. Each time the accumulated points HGP reach 100% of a predetermined value (the representation of the bar graph HB reaches a predetermined length), one hero point HP is acquired and the accumulated points are cleared (in the diagram, eight hero points HP out of the upper limit of 12 points have been acquired). The effect of the hero points HP will be described later.

The player character FC1 can make an attack by targeting at any one of the enemy characters EC1 to EC4 (which is carried out by an input signal based on an operation such as pressing a predetermined button on the controller). When the targeting is completed, there appears a target set indication TS which indicates which object is aimed at (in the diagram, the indication appears on the gauge EG1 of the enemy character EC1).

The attack is carried out by an input signal based on an operation such as pressing a predetermined button on the controller, whereby shooting or the like is performed on the enemy character (for example, EC1).

[Damage]

When the player characters FC1 to FC3 attack the enemy characters EC1 to EC4, the vitality parameters of the enemy characters EC1 to EC4 are damaged. When the player characters FG1 to FG3 are attacked by the enemy characters EC1 to EC4, the vitality parameters of the player characters FG1 to FG3 are damaged.

The rules for damage are common to all the characters FC1 to FC3 and EC1 to EC4. The following are the basic rules.

[Basic Rules for Damage]

(1) When there is no damage, the vitality parameter Lp is 100% of the upper limit setting of the character. As shown in FIG. 15(*a*), the bar graph representation LPB has a length that indicates 100% of the upper limit of the vitality parameter Lp. If the vitality parameter of the character falls to 0% of the upper limit, the character becomes an inoperative state (uncontrollable).

(2) Damages include ineffective damage (scratch damage) and effective damage (fixed damage). Whether a character-on-character attack results in scratch damage or fixed damage is basically determined based on an attack power parameter (degree of direct hit) of the weapon that is used for the attack.

(3) When an attack results in scratch damage, the amount of ineffective damage Ds based on the scratch damage is stored into the memory 1020. The state where the amount of ineffective damage Ds is stored in the memory 1020 will hereinafter be referred to as there being scratch damage. As shown in FIG. 15(*b*), when there is scratch damage, the value of Ds is displayed in different color to indicate that there is as much scratch damage as Ds, without changing the length of the entire bar graph LPB.

(4) When an attack results in fixed damage, the vitality parameter Lp of the attacked character is decreased by the amount of effective damage Df based on the fixed damage. As shown in FIG. 15(*c*), when there is fixed damage, the values of Lp and Df are displayed in different colors to indicate that there is as much fixed damage as Df, without changing the length of the entire bar graph LPB.

(5) As shown in FIG. 15(*d*), when there are both scratch damage and fixed damage, the bar graph LPB shows the vitality parameter Lp, the amount of ineffective damage Ds, and the amount of effective damage Df in different colors in a predetermined layout, for example, in order from the left to indicate that there are both scratch damage and fixed damage.

(6) If there is fixed damage (FIG. 16(*a*)) and an attack results in new scratch damage, the amount of ineffective damage Ds based on the scratch damage is stored into the memory 1020. As shown in FIG. 16(*b*), the vitality parameter Lp, the amount of ineffective damage Ds, and the amount of effective damage Df are displayed in different colors in order from the left to indicate that there are both scratch damage and fixed damage.

(7) If there is scratch damage (FIG. 17(*a*)) and an attack results in new fixed damage (FIG. 17(*b*)), the vitality parameter Lp of the attacked character is decreased by the total amount of damage (Df+Ds) including the amount of ineffective damage Ds stored in the memory 1020 and the effective damage Df. That is, the amount of damage (Df+Ds) is handled the same as the amount of a effective damage.

As shown in FIG. 17(*c*), the vitality parameter Lp and the amount of damage (Df+Ds) are displayed in different colors in order from the left. The part of the amount of ineffective damage Ds is converted into the same color as that of the amount of effective damage Df to indicate that there is the amount of effective damage (Df+Ds). Rendering the part of the amount of ineffective damage Ds in the bar graph LPB in the same color as with the amount of effective damage makes to be thought the scratch damage is converted into the fixed damage.

(8) When there is scratch damage, the amount of ineffective damage Ds stored in the memory 1020 is updated to one decreased by a predetermined amount as the time elapses. Here, the differently-colored part of the bar graph LPB resulting from the amount of ineffective damage Ds is restored to the normal vitality parameter Lp over time, whereby the vitality parameter LP can be presented to the player as if automatically recovering little by little. Even if the amount of ineffective damage Ds resulting from the occurrence of scratch damage reaches 100% of the vitality parameter Lp (all the Lp part of the bar graph LPB is in the color of Ds), the character will not become the inoperative state (uncontrollable) since the vitality parameter Lp is not 0% of the upper limit.

(9) The situation of there being fixed damage is where there is a predetermined time delay between when the fixed damage occurs and when the decrease of the vitality parameter Lp is fixed. Here, the delayed state is expressed by decreasing the length of the amount of effective damage Df (for the sake of convenience, Df+Ds will also be denoted as Df) displayed on the bar graph LPB over time. When the representation of the amount of effective damage Df on the bar graph LPB disappears, which means the disappearance of the delay, the decrease of the vitality parameter Lp is fixed. If the decrease-fixed vitality parameter Lp falls to 0% of the upper limit, the character becomes inoperable (uncontrollable). Since there is provided a delay before the decrease is fixed, it is possible for the player to make an operation such as pressing a predetermined button on the controller to input an input signal for restoring the vitality parameter Lp before fixed. Alternatively, the decrease of the vitality parameter Lp may be fixed simultaneously with the occurrence of fixed damage without providing a delay. In such a case, it is not possible for the player to prevent the character from becoming inoperable (uncontrollable) when fixed damage occurs and the vitality parameter Lp falls to 0% of the upper limit. This can create a sense of tension for the player.

As described above, it provides scratch damage which will not make the character inoperable (uncontrollable) and allows automatic recovery even if the vitality parameter Lp falls to 0% of the upper limit, and fixed damage which does not allow automatic recovery of the vitality parameter Lp. In addition, if a predetermined condition is satisfied, scratch damage is displayed to the player as if converted into fixed damage. Thus, the progress of the game diversifies.

(10) Aside from scratch damage and fixed damage, the damages to decrease the vitality parameter Lp include a scratch disabling attribute given by a predetermined attack.

(11) There is progressive damage processing of increasing scratch damage over time to decrease the vitality parameter Lp little by little.

Then, applications of the foregoing basic rules and other rules of the game will be described as related to an embodiment of the game control program according to the present invention.

[Game Control Program]

Figure 4:
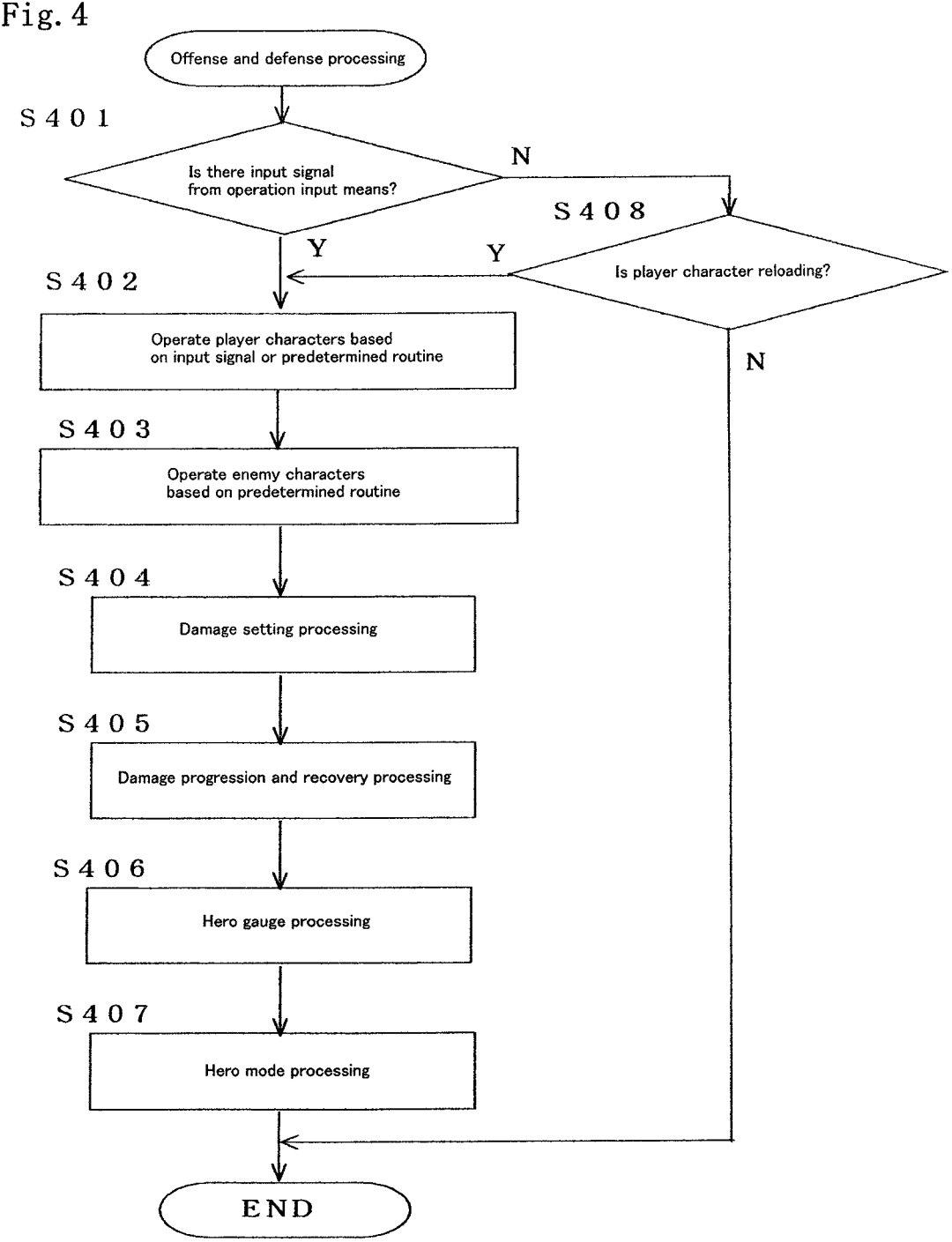
FIG. 4 is a flowchart showing offense and defense processing according to an embodiment of the game control program to be executed by the game apparatus of FIG. 1.
Figure 5:
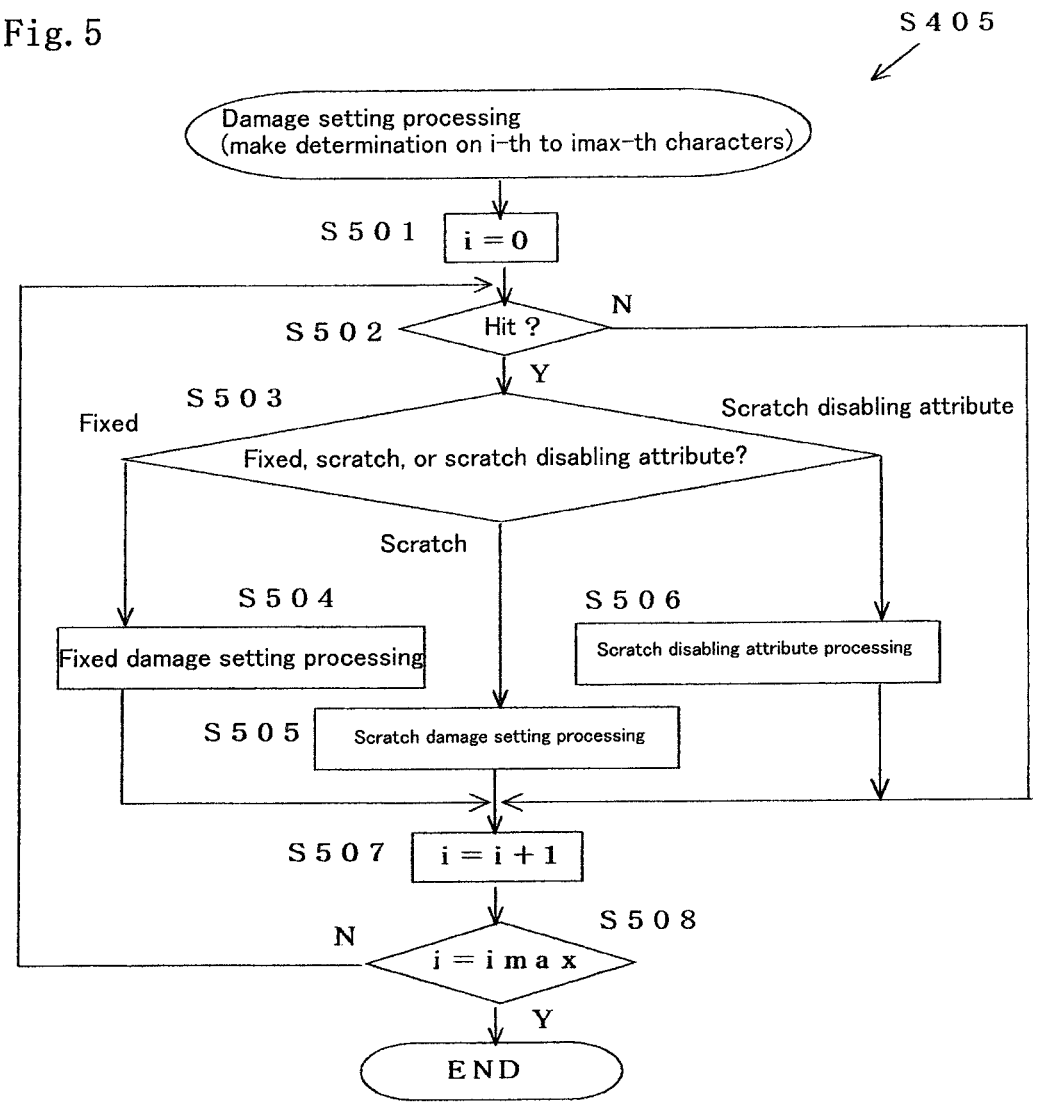
FIG. 5 is a flowchart showing the damage setting processing in the processing of FIG. 4.
Figure 6:
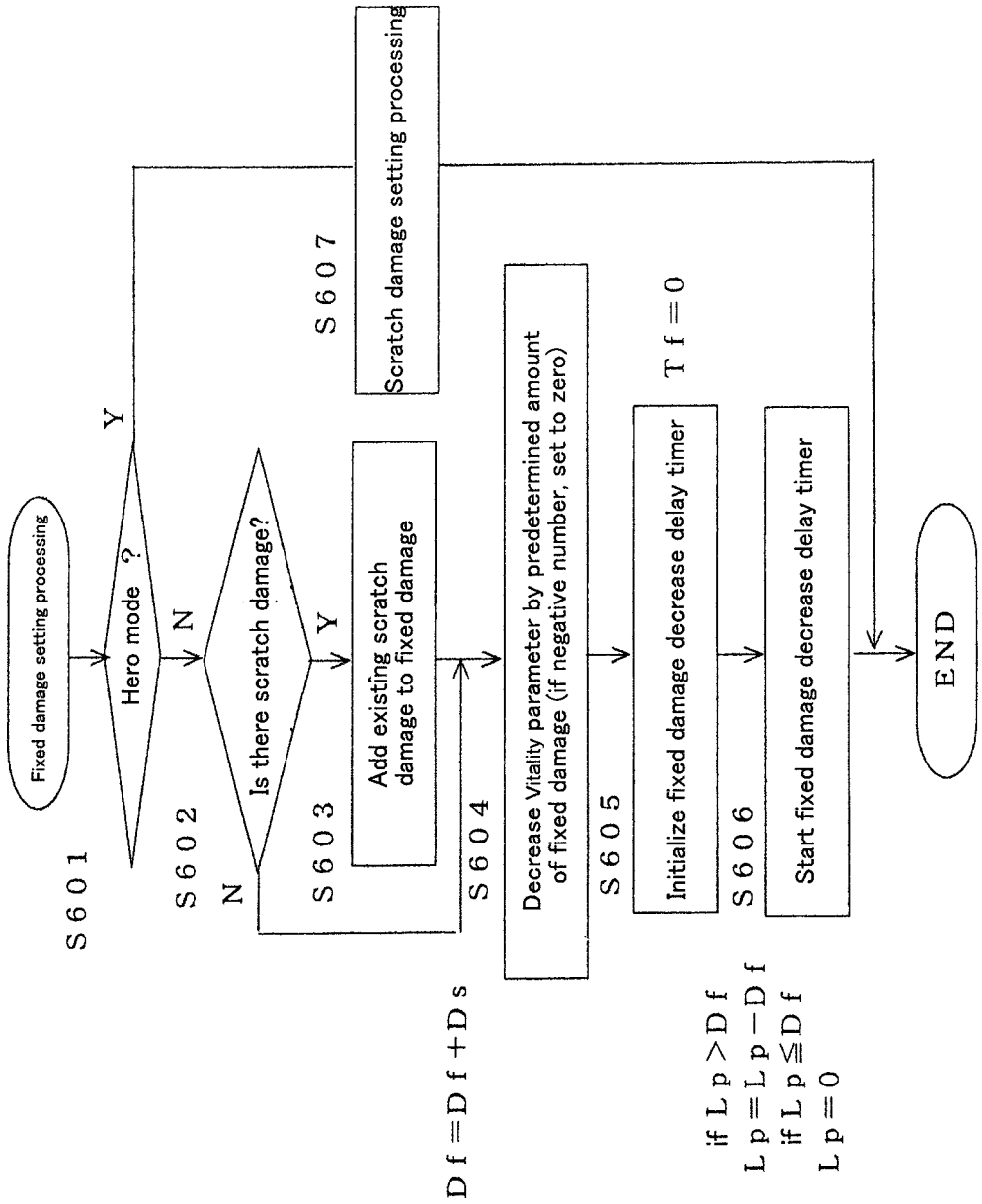
FIG. 6 is a flowchart showing the fixed damage setting processing in the processing of FIG. 5.
Figure 7:
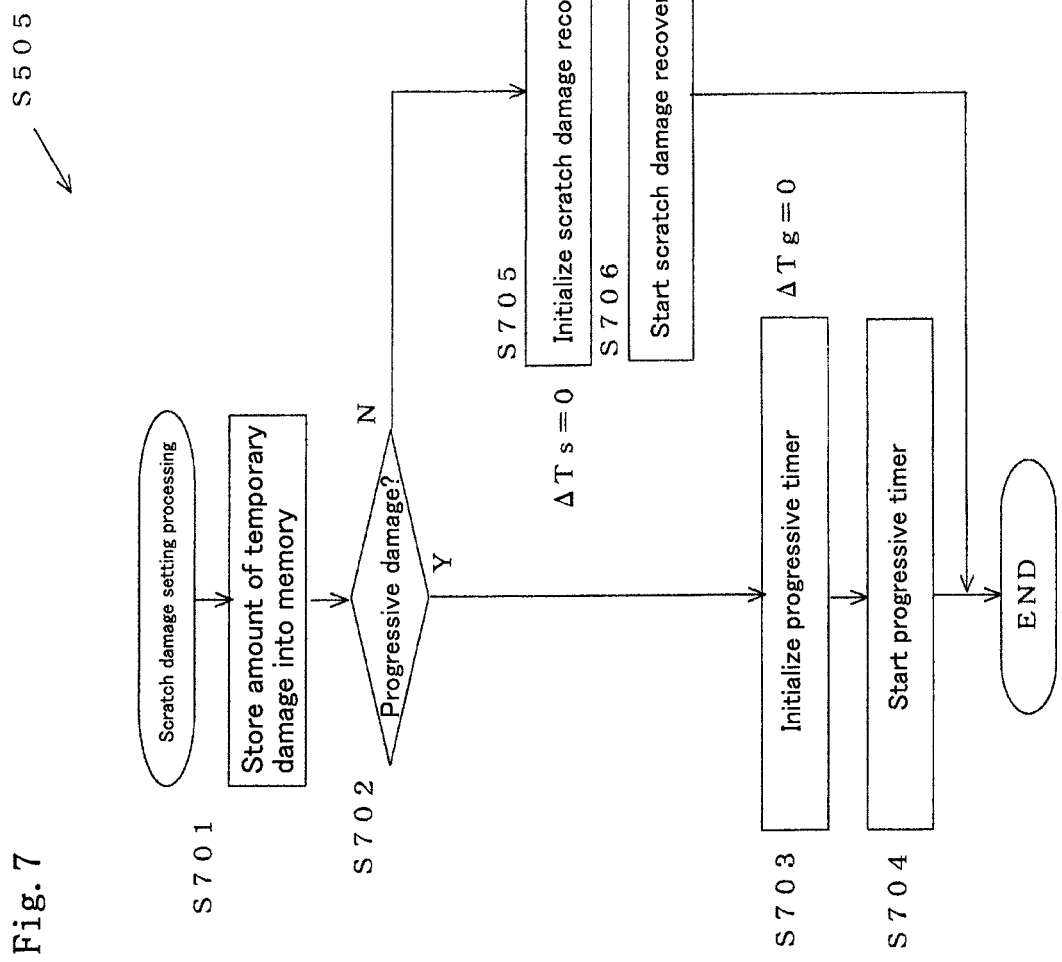
FIG. 7 is a flowchart showing the scratch damage setting processing in the processing of FIG. 5.
Figure 8:
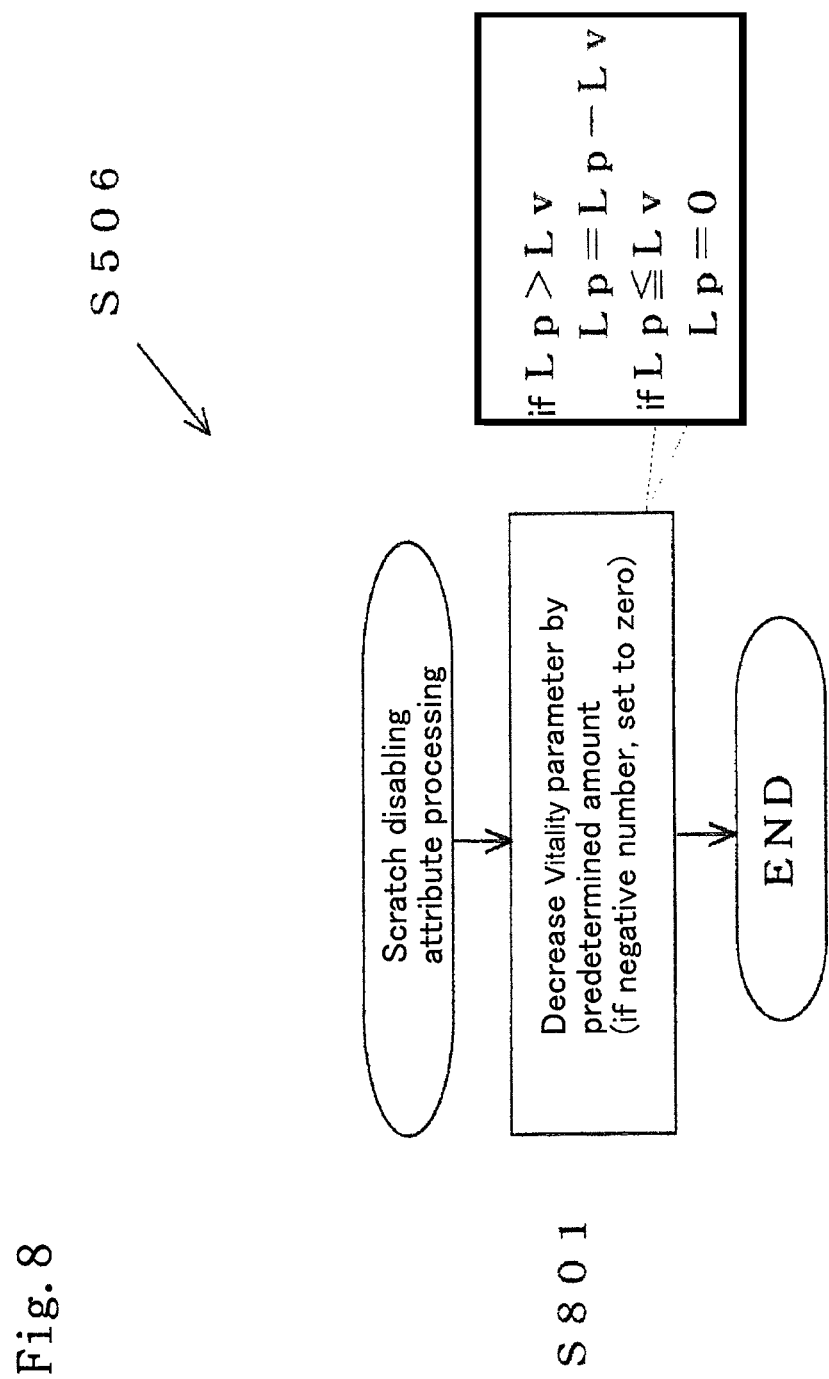
FIG. 8 is a flowchart showing the scratch disabling attribute processing in the processing of FIG. 5.
Figure 9:
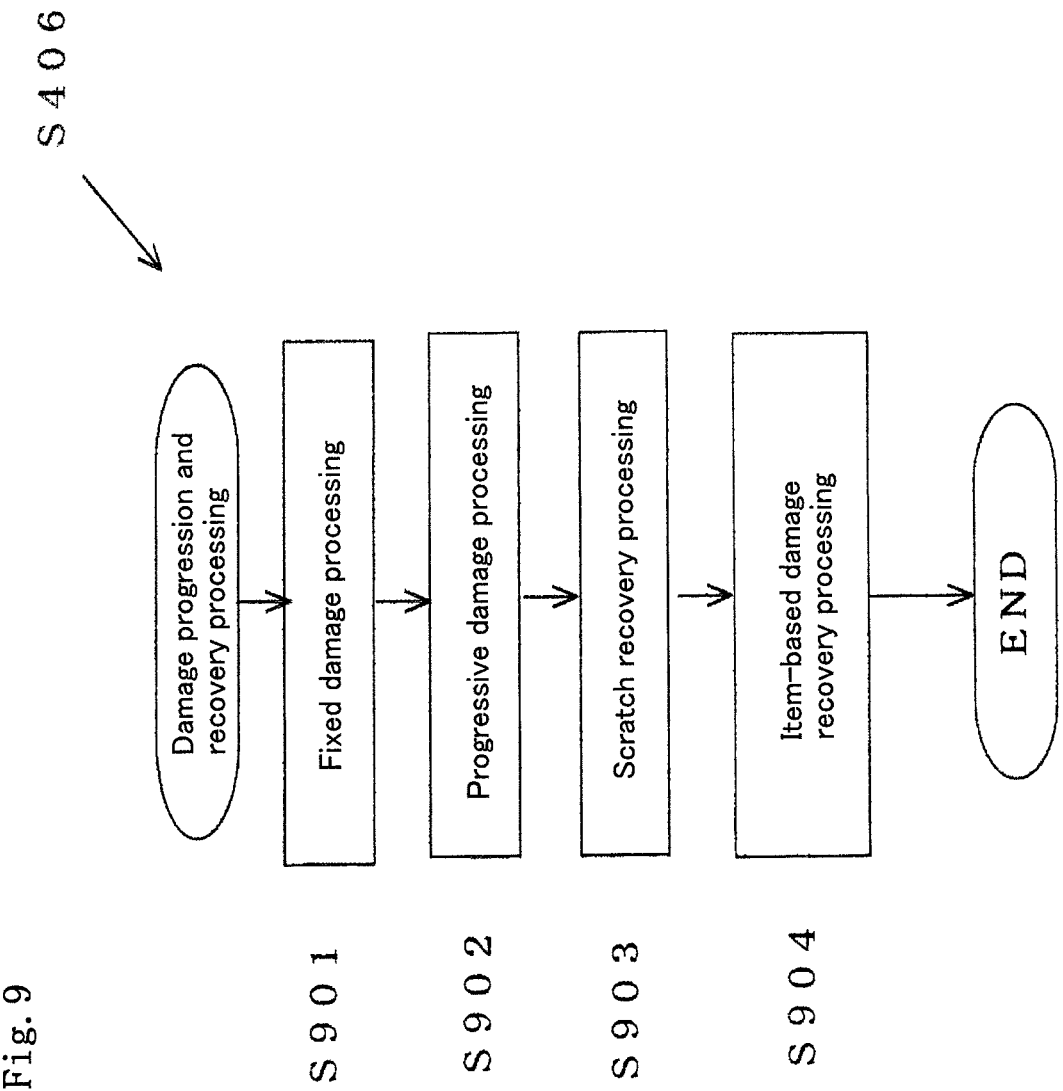
FIG. 9 is a flowchart showing the damage progression and recovery processing in the processing of FIG. 4.
Figure 10:
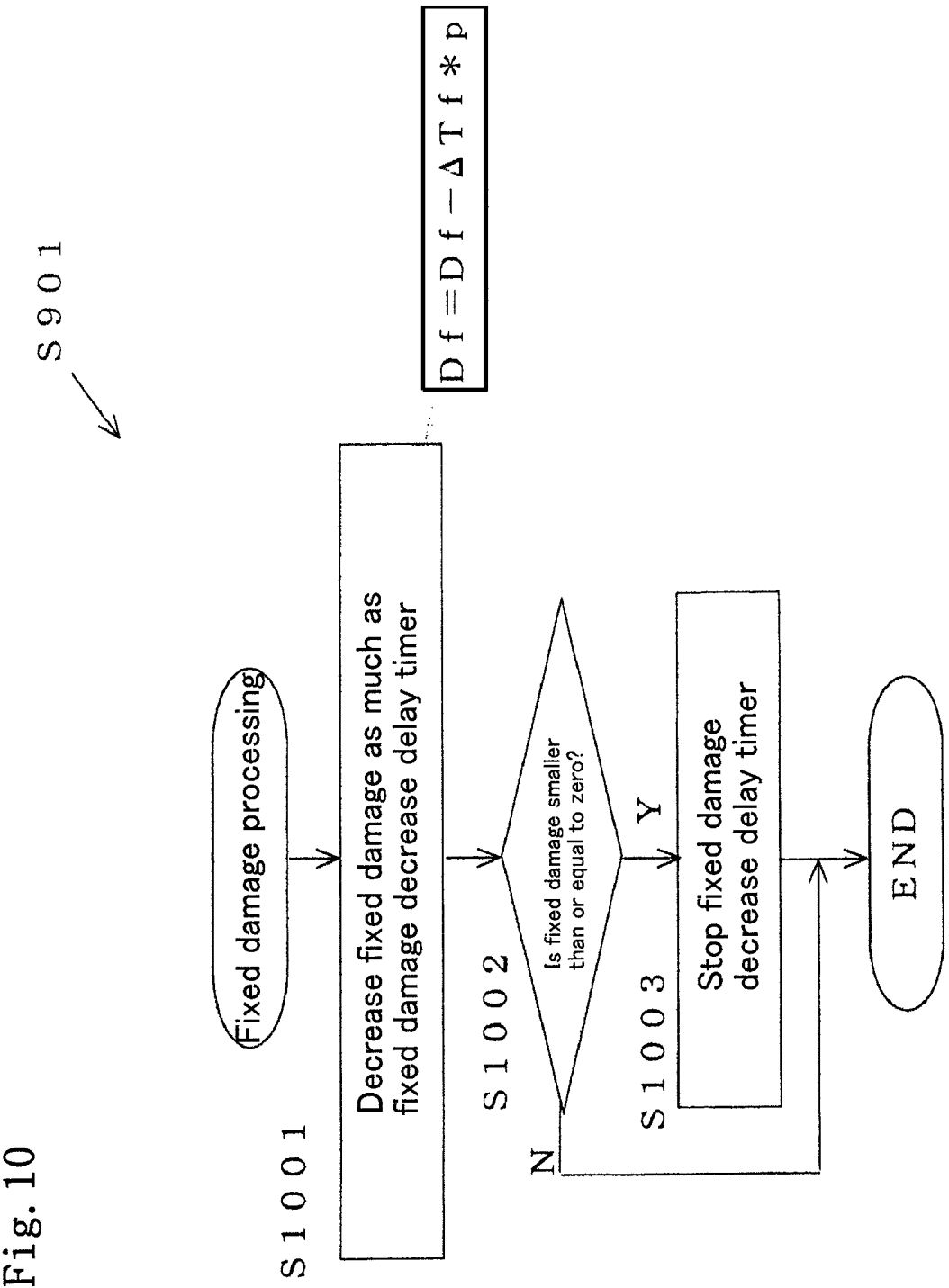
FIG. 10 is a flowchart showing the fixed damage processing in the processing of FIG. 9.
Figure 11:
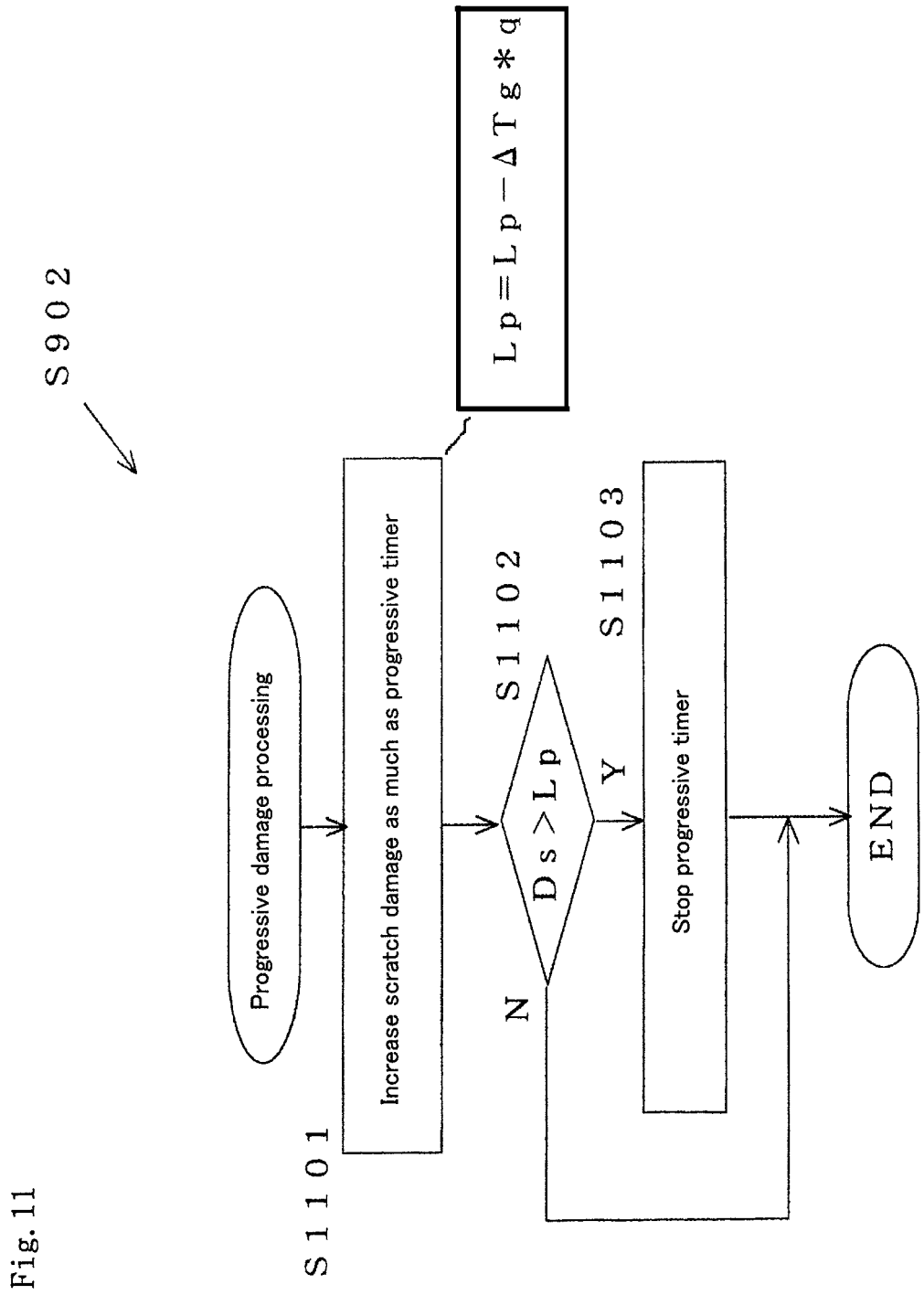
FIG. 11 is a flowchart showing the progressive damage processing in the processing of FIG. 9.
Figure 12:
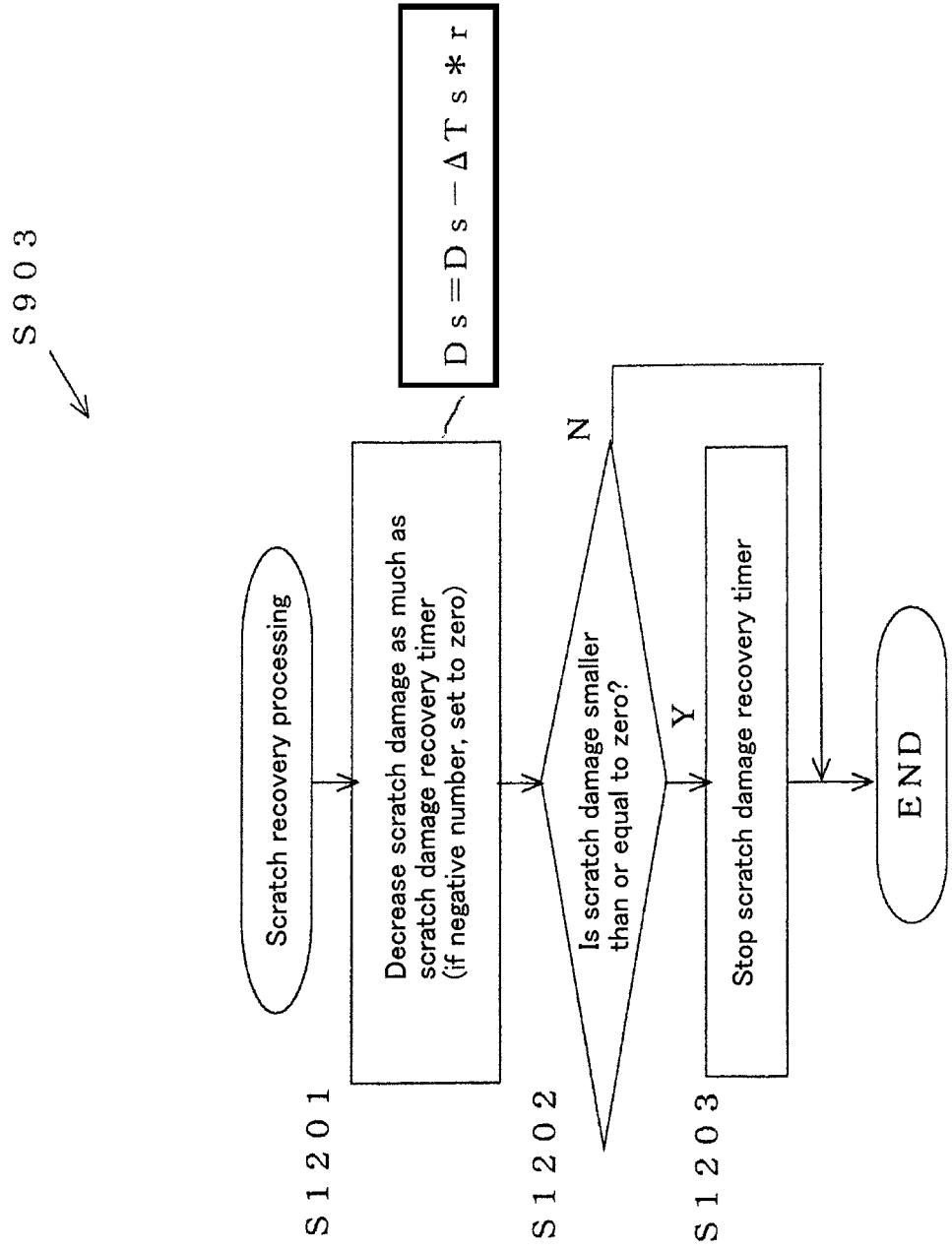
FIG. 12 is a flowchart showing the scratch recovery processing in the processing of FIG. 9.
Figure 13:
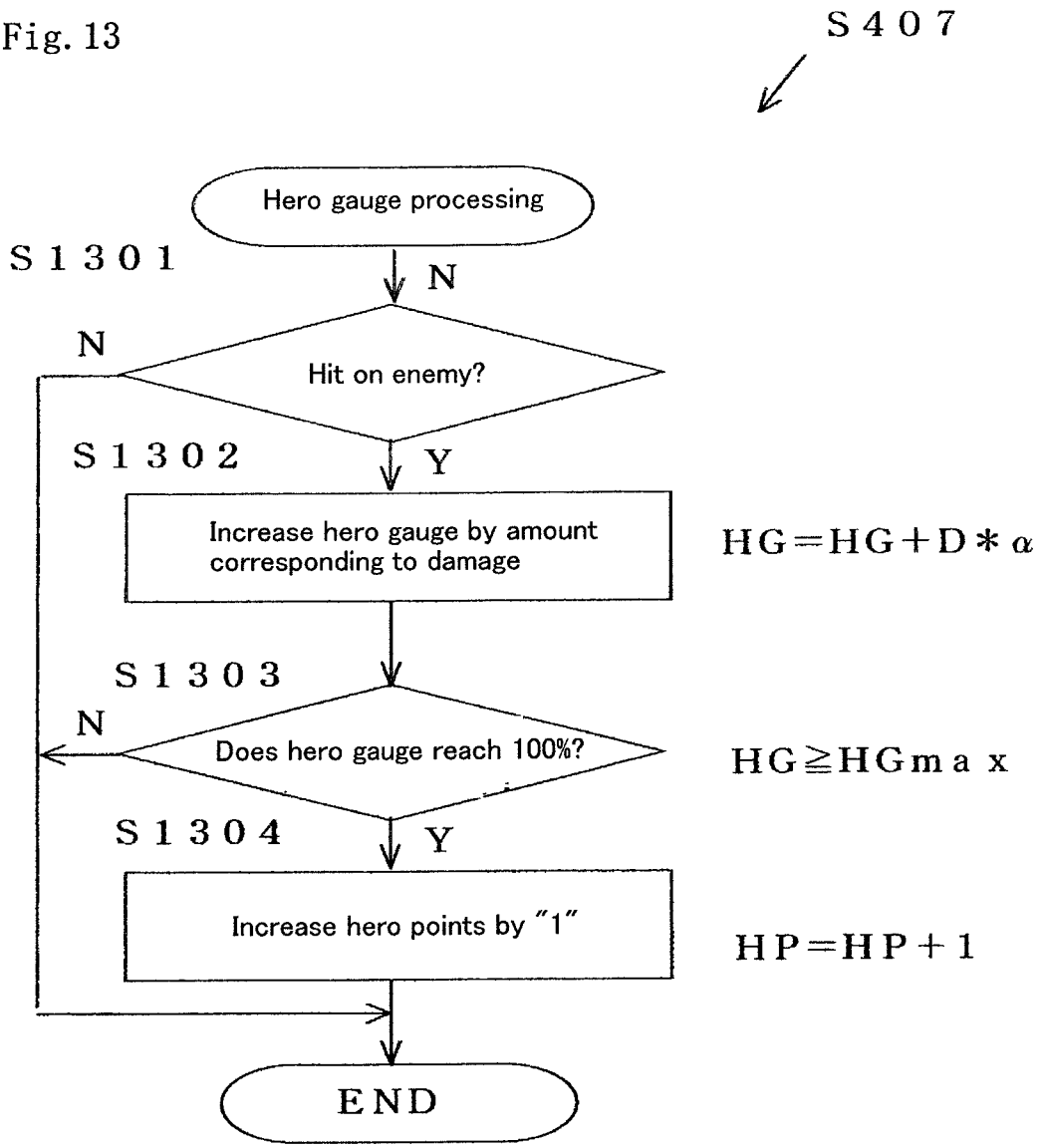
FIG. 13 is a flowchart showing the hero gauge processing in the processing of FIG. 4.

FIG. 4 is a flowchart showing offense and defense processing according to the embodiment of the game control program to be executed by the game apparatus of FIG. 1. FIG. 5 is a flowchart showing the damage setting processing in the processing of FIG. 4. FIG. 6 is a flowchart showing the fixed damage setting processing in the processing of FIG. 5. FIG. 7 is a flowchart showing the scratch damage setting processing in the processing of FIG. 5. FIG. 8 is a flowchart showing the scratch disabling attribute processing in the processing of FIG. 5. FIG. 9 is a flowchart showing the damage progression and recovery processing in the processing of FIG. 4. FIG. 10 is a flowchart showing the fixed damage processing in the processing of FIG. 9. FIG. 11 is a flowchart showing the progressive damage processing in the processing of FIG. 9. FIG. 12 is a flowchart showing the scratch recovery processing in the processing of FIG. 9. FIG. 13 is a flowchart showing the hero gauge processing in the processing of FIG. 4. FIG. 14 is a flowchart showing the item-based damage recovery processing in the processing of FIG. 9.

In FIG. 4, offense and defense between the virtual player characters FC1 to FC3 vs. enemy characters EC1 to EC4 in the game are performed by CPU 1000, which is a control means, being executed the following steps.

Step S401: Initially, the CPU 1000 determines whether there is any offense and defense-related input signal (one that causes a character action such as a move, attack, and guard) from the operation input means 2100, 2110, 2120, and 2300. If there is an offense and defense-related input signal (hereinafter, referred to simply as an input signal), the CPU 1000 proceeds to step S402. If there is no input signal, the CPU 1000 proceeds to step S408.

If there is an input signal, the CPU 1000 processes that causes damage or the like will be performed since the player is making some kind of offense and defense-related operation. If there is no input signal, which is considered to be a standby state, the CPU 1000 suspends the processing of offense and defense in the game and the processing related to increase or decrease the vitality parameter. That gives time composure to the players.

Step S402: The CPU 1000 operates the player characters FC1 to FC3 based on the input signal or based on a predetermined routine of the game control program. The CPU 1000 then proceeds to step S403.

Step S403: The CPU 1000 operates the enemy characters EC1 to EC4 based on a predetermined routine of the game control program. The CPU 1000 then proceeds to step S404.

Step S404: The CPU 1000 performs damage setting processing for the case where an attack results in new damage, and it proceeds to step S405.

Step S405: The CPU 1000 performs damage progression and recovery processing of making existing damage progress or making a recovery, and it proceeds to step S406. Here, the progress of damage refers to the vitality parameter varying with a lapse of time after the occurrence of the damage.

Step S406: The CPU 1000 performs processing related to the hero gauge HG, and it proceeds to step S407.

Step S407: The CPU 1000 performs processing related to the hero points HP, and it simply ends processing.

Step S408: If it is determined at step S401 that there is no input signal, the CPU 1000 determines whether or not processing of loading (reloading) a player character's weapon is in progress. If the reloading processing is in progress, the CPU 1000 proceeds to step S402 without entering the standby state even if there is no input signal. If reloading processing is not in progress, the CPU 1000 ends the offense and defense processing.

The damage setting processing (step S404) of FIG. 4 is performed by the CPU 1000 executing the following steps. As shown in FIG. 5, the CPU 1000 handles all the player characters and enemy characters appearing in the offense and defense scene as a group of a total number imax of characters, assigns number i to each character, and sets damage in turn.

Step S501: Initially, the CPU 1000 sets the number i to zero in order to focus on the first character.

Step S502: The CPU 1000 determines whether or not an attack on the i-th character hits successfully. If the attack hits successfully, the CPU 1000 proceeds to step S503. If the attack fails, the CPU 1000 proceeds to step S507 since there is no damage.

Step S503: The CPU 1000 refers to the degree of direct hit and determines which damage occurs, fixed damage, scratch damage, or damage of the scratch disabling attribute. If fixed damage occurs, the CPU 1000 proceeds to step S504. If scratch damage, the CPU 1000 proceeds to step S505. If the scratch disabling attribute, the CPU 1000 proceeds to step S506.

When a player character makes an attack on an enemy character, the degree of direct hit may be increased by an operation such as pressing a predetermined button continuously. This can increase the gaming flexibility.

Step S504: The CPU 1000 performs fixed damage setting processing to cause fixed damage, and proceeds to step S507.

Step S505: The CPU 1000 performs scratch damage setting processing to cause scratch damage, and it proceeds to step S507.

Step S506: The CPU 1000 performs scratch disabling attribute processing, and it proceeds to step S507.

Step S507: The CPU 1000 increments the character number i by "+1", and it proceeds to step S508.

Step S508: The CPU 1000 determines whether or not the character number i reaches imax, that is, whether or not all the characters appearing in the offense and defense scene have been referred to. If all the characters have not been referred to yet, the CPU 1000 returns to step S503. If all the characters have been referred to, the CPU 1000 just ends processing.

In FIG. 6, the fixed damage setting processing (step S504) of FIG. 5 is performed by the CPU 1000 executing the following steps.

Step S601: Initially, the CPU 1000 determines whether or not the damaged character is in a hero mode. The hero mode is an advantage given to a player character that has acquired a hero point(s), in exchange for consuming one hero point. The hero mode is thus not available for enemy characters and is prepared to provide a pleasant play condition for players.

In addition, the hero mode is not automatically activated in the presence of a hero point but is operated by the player's choice. The player can thus select the game play condition by himself/herself, and higher gaming flexibility can be obtained.

If it is in the hero mode, the CPU 1000 proceeds to step S607. If it is not in the hero mode, the CPU 1000 proceeds to step S602.

Step S602: The CPU 1000 determines whether or not there is existing scratch damage. If there is scratch damage, the CPU 1000 proceeds to step S603. If there is no scratch damage, the CPU 1000 jumps to step S604.

Step S603: The CPU 1000 adds the amount of ineffective damage Ds to the amount of effective damage Df. That is, the CPU 1000 determines Df(new)=Df(old)+Ds, and it proceeds to step S604. In similar expressions in the following description, the same parameters on both sides of an equal sign will be assumed so that the left parameter is the new one and the right parameter the previous one.

Adding the amount of ineffective damage Ds to the amount of effective damage Df has the effect of providing qualitative variations for damage and allowing a wide range of tactics.

For example, even the amount of ineffective damage Ds of 100% the vitality parameter Lp does not lead to inoperability (uncontrollability). Any fixed damage in such a state, regardless of the magnitude, can decrease the vitality parameter Lp by the total of the amount of ineffective damage Ds and the amount of effective damage Df, eventually making the character inoperable (uncontrollable).

Step S604: The CPU 1000 decreases the vitality parameter Lp by the amount of effective damage Df resulting from the fixed damage. It should be noted that Lp=0 if the remaining vitality parameter Lp is short.

That is, $Lp=Lp-Df$ if $Lp>Df$; and $Lp=0$ if $Lp \leq Df$.

As shown in FIG. 15(*c*), when there is fixed damage, the CPU 1000 displays the values of Lp and Df in different colors to indicate that there is fixed damage, without changing the length of the entire bar graph LPB.

Then, the CPU 1000 proceeds to step S605.

Step S605: The CPU 1000 initializes a fixed damage decrease delay timer ΔTf to zero. The representation of the amount of effective damage Df on the bar graph LPB decreases over time in response to the fixed damage decrease delay timer ΔTf. When the representation of the amount of effective damage Df on the bar graph LPB disappears, the decrease of the vitality parameter Lp as much as the amount of effective damage Df is fixed.

Then, the CPU 1000 proceeds to step S606.

Step S606: The CPU 1000 starts the fixed damage decrease delay timer, and it just ends processing.

Step S607: The CPU 1000 performs the scratch damage setting processing, and it ends processing after that. The scratch damage setting processing will be described in detail as related to FIG. 7.

The scratch damage setting processing (steps S505 and S607) of FIG. 5 is performed, as shown in FIG. 7, by the CPU 1000 executing the following steps.

Step S701: Initially, the CPU 1000 stores the amount of ineffective damage Ds based on the scratch damage into the memory 1020.

As shown in FIG. 15(*b*), when there is scratch damage, the value of Ds is displayed in different color to indicate that there is as much scratch damage as Ds, without changing the length of the entire bar graph LPB.

Then, the CPU 1000 proceeds to step S702.

Step S702: The CPU 1000 determines whether or not the scratch damage is progressive damage. Progressive damage is scratch damage caused by a weapon that is set to be effective over time, such as a tranquilizer gun. Progressive damage increases in response to a progressive timer ΔTg.

If the scratch damage is progressive damage, the CPU 1000 proceeds to step S703. If the scratch damage is not progressive damage, the CPU 1000 proceeds to step S705.

Step S703: The CPU 1000 initializes the progressive timer ΔTg to zero, and it proceeds to step S704.

Step S704: The CPU 1000 starts the progressive timer ΔTg, and simply ends processing.

Step S705: The CPU 1000 initializes a scratch damage recovery timer ΔTs to zero. The amount of ineffective damage Ds decreases over time in response to the scratch damage recovery timer ΔTs.

Then, the CPU 1000 proceeds to step S706.

Step S706: The CPU 1000 starts the scratch damage recovery timer ΔTs, and it simply ends processing.

The scratch disabling attribute processing (step S506) of FIG. 5 is performed, as shown in FIG. 8, by the CPU 1000 executing the following steps.

Step S801: When there is damage Lv of the scratch disabling attribute, the CPU 1000 decreases the vitality parameter Lp by a predetermined amount. However, if the remaining vitality parameter Lp is short, it sets Lp=0.

That is, $Lp=Lp-Lv$ if $Lp>Lv$; and $Lp=0$ if $Lp \leq Lv$.

Subsequently, the CPU 1000 just ends processing.

The damage progression and recovery processing (step S406) of FIG. 4 is performed, as shown in FIG. 9, by the CPU 1000 executing the following steps.

Step S901: Initially, the CPU 1000 performs fixed damage processing of decreasing the display length of fixed damage, and proceeds to step S902.

The fixed damage processing will be described in detail as related to FIG. 10.

Step S902: The CPU 1000 performs progressive damage processing of increasing progressive damage, and it proceeds to step S903.

The progressive damage processing will be described in detail as related to FIG. 11.

Step S903: The CPU 1000 performs scratch recovery processing of making scratch damage recover, and it proceeds to step S904.

The scratch recovery processing will be described in detail as related to FIG. 12.

Step S904: The CPU 1000 performs item-based damage recovery processing, and it just ends processing.

The item-based damage recovery processing will be described in detail as related to FIG. 14.

The fixed damage processing (step S901) of FIG. 9 is performed, as shown in FIG. 10, by the CPU 1000 executing the following steps.

Step S1001: The CPU 1000 changes the representation of the amount of effective damage Df on the bar graph LPB so that the representation decreases in length as much as the fixed damage decrease delay timer ΔTf, multiplied by a predetermined coefficient p (equivalent to the rate of decrease).

That is, $Df=Df-\Delta Tf^{*}p$; and $Df=0$ if $Df \leq \Delta Tf$.

Step S1002: The CPU 1000 determines whether or not the amount of effective damage Df falls to or below zero. If Df>0, the CPU 1000 simply ends processing. If Df≤0, the CPU 1000 proceeds to step S1003.

Step S1003: The CPU 1000 stops the fixed damage decrease delay timer ΔTf, and it just ends processing.

The progressive damage processing (step S902) of FIG. 9 is performed, as shown in FIG. 11, by the CPU 1000 executing the following steps.

Step S1101: Initially, the CPU 1000 increases the amount of ineffective damage Ds as much as the progressive timer ΔTg, multiplied by a predetermined coefficient q (equivalent to the rate of progressive increase).

That is, $$Ds=Ds+\Delta Tg*q.$$

As shown in FIG. 15(b), when there is scratch damage Ds, the value of Ds is displayed in different color without changing the length of the entire bar graph LPB in order to indicate that there is as much scratch damage as Ds.

Step S1102: The CPU 1000 determines whether or not the amount of ineffective damage Ds reaches 100% of the vitality parameter Lp. If Lp>Ds, the CPU 1000 simply ends processing. If Lp≤Ds, the CPU 1000 proceeds to step S1103.

Step S1103: The CPU 1000 stops the progressive timer ΔTg, and it just ends processing.

The scratch recovery processing (step S903) of FIG. 9 is performed, as shown in FIG. 12, by the CPU 1000 executing the following steps.

Step S1201: Initially, the CPU 1000 decreases the amount of ineffective damage Ds as much as the scratch recovery timer ΔTs, multiplied by a predetermined coefficient r (equivalent to the rate of recovery).

That is, $$Ds=Ds-\Delta Ts*r.$$

Step S1202: The CPU 1000 determines whether or not the scratch damage falls to or below zero. If the scratch damage is greater than zero, the CPU 1000 simply ends processing. If the scratch damage is smaller than or equal to zero, the CPU 1000 proceeds to step S1203.

Step S1203: The CPU 1000 stops the scratch recovery timer ΔTs, and it just ends processing.

The hero gauge processing (step S407) of FIG. 4 is performed, as shown in FIG. 13, by the CPU 1000 executing the following steps.

Step S1301: Initially, the CPU 1000 determines whether or not an attack of any one of the player characters hits successfully on any one of the enemy characters. If the attack hits successfully, the CPU 1000 proceeds to step S1302. If not, the CPU 1000 simply ends processing.

Step S1302: The CPU 1000 increases the accumulated points HGP of the player character by an amount corresponding to the damage that the successful attack gives to the enemy character.

That is, HGP=HGP+D*α, where D is the damage (Ds or Df) given to the enemy, and α is a coefficient.

Step S1303: The CPU 1000 determines whether or not the accumulated points reach 100% of a predetermined value (HGPmax). If the accumulated points reach 100%, the CPU 1000 proceeds to step S1304. If the accumulated points do not reach 100%, the CPU 1000 simply ends processing.

Step S1304: The CPU 1000 increases the hero points HP by "+1" and simply ends processing. That is, HP=HP+1.

The item-based damage recovery processing (step S904) of FIG. 9 is performed, as shown in FIG. 14, by the CPU 1000 executing the following steps. The item-based damage recovery processing in the game is performed when a player makes an operation to use an item (such as medicine) effective for damage recovery on any one of the player characters.

Step S1401: The CPU 1000 increases the vitality parameter Lp by the amount of damage recovery Li (Lp=Lp+Li), and it proceeds to step S1402.

Step S1402: The CPU 1000 determined whether or not the vitality parameter Lp exceeds a predetermined maximum value Lpmax (Lp>Lpmax). If Lp>Lpmax, the CPU 1000 proceeds to step S1403. If Lp≤Lpmax, the CPU 1000 jumps to step S1405.

Step S1403: The CPU 1000 sets a value by subtracting (Lp−Ds) from Lpmax, that is, Ds=Lpmax−(Lp−Ds). The CPU 1000 then proceeds to step S1404.

Step S1404: The CPU 1000 sets the vitality parameter Lp to the maximum value Lpmax (Lp=Lpmax), and it just ends processing.

Step S1405: The CPU 1000 determines whether or not the display length of the bar graph LPB, which indicates the sum of the vitality parameter Lp and the fixed damage Df, exceeds a length Tmax that indicates 100% of the upper limit of Lp (the display length of (Lp+Df)>Tmax). If the display length of (Lp+Df)>Tmax, the CPU 1000 proceeds to step S1406. If the display length of (Lp+Df)≤Tmax, the CPU 1000 simply ends processing.

Step S1406: The CPU 1000 decreases the length of the representation of the fixed damage Df so that the length of the bar graph LPB will not exceed the length that indicates 100% of the upper limit of Lp. That is, the CPU 1000 sets the display length of (Lp+Df)=Tmax, and it just ends processing.

What is claimed is:

1. A game control method for making a computer, having a processor, a memory, and operation input means, perform game processing in which a player character that acts in response to a player operation and an enemy character attack each other, and in which a vitality parameter set for the player character is decreased in accordance with damage given to the player character when the enemy character makes an attack on the player character, the game control method comprising the steps of:

setting by the processor the damage as ineffective damage or effective damage based on a value of an attack-power parameter of a weapon used in the attack by the enemy character;

storing by the processor an amount of said ineffective damage into the memory when the player character is given the ineffective damage;

restoring by the processor the amount of the ineffective damage stored in the memory decreased by a predetermined amount as time elapses after the player character is given the ineffective damage;

calculating by the processor, as the player character is given effective damage while the amount of ineffective damage is stored in the memory, a total amount of damage that includes an amount of effective damage based on the effective damage and the amount of ineffective damage in the memory, and decreasing by the processor the vitality parameter of the player character based on the amount of damage;

setting the attack-power parameter for the attack, wherein said setting the damage sets the damage as the effective damage or the ineffective damage based on the attack-power parameter;

generating by the processor one or more points for the player character for each successful attack on the enemy character by the player character; and changing by the processor, when an accumulation of points reaches a predetermined amount, a state of the player character in which all damage incurred by the player character during a predetermined period of a remainder of a current game is set as ineffective damage regardless of the attack-power parameter value.

2. The game control method according to claim 1, wherein game processing in which the enemy character attacks the player character and game processing of restoring the ineffective damage over time are performed by the processor on condition that there is an input signal from the operation input means.

3. The game control method according to claim 1, further comprising the step of:
    increasing by the processor the attack-power parameter value in response to a determination by the processor that an input signal from the operation input means lasts for a predetermined time.

4. The game control method according to claim 1, further comprising the steps of:
    providing by the processor a delay before the decrease of the vitality parameter is fixed, and
    before the decrease of vitality parameter is fixed, restoring by the processor the vitality parameter in response to an input signal of a predetermined button.

5. The game control method according to claim 1, further comprising the step of:
    processing by the processor a progressive damage of increasing the ineffective damage over time to decrease the vitality parameter.

6. The game control method according to claim 1, further comprising:
    displaying the vitality parameter;
    setting by the processor the damage as effective damage based on said value of the attack-power parameter; and
    setting by the processor the vitality parameter at a decreased level based on the effective damage after a prescribed delay time expires unless the decrease is cancelled in response to an input by the operation input means.

7. A game apparatus including a processor, a computer-readable non-transient memory device, and an operation input device, that perform a game processing method in which a player character that acts in response to a player operation and an enemy character attack each other, and wherein a vitality parameter set for the player character is decreased in accordance with damage given to the player character when the enemy character makes an attack on the player character, the apparatus comprising:
    means for setting the damage as ineffective damage or effective damage based on degree of direct hit by attacking from the enemy character;
    means for setting the damage as ineffective damage or effective damage based on a value of an attack-power parameter of a weapon used in the attack by the enemy character;
    means for storing an amount of said ineffective damage into the memory when the player character is given the ineffective damage;
    means for restoring the amount of ineffective damage stored in the memory to one decreased by a predetermined amount as time elapses after the player character is given the ineffective damage;
    means for calculating, if the player character is given effective damage while the amount of ineffective damage is stored in the memory, a total amount of damage that includes an amount of effective damage based on the effective damage and the amount of ineffective damage in the memory, and decreasing the vitality parameter of the player character based on the amount of damage;
    means for setting the attack-power parameter for the attack, wherein said means for setting the damage sets the damage as the effective damage or the ineffective damage based on the attack-power parameter;
    means for generating one or more points for the player character for each successful attack on the enemy character by the player character; and
    means for changing, when an accumulation of points reaches a predetermined amount, a state of the player character in which all damage incurred by the player character during a predetermined period of a remainder of a current game is set as ineffective damage regardless of the attack-power parameter value.

8. The game apparatus according to claim 7, further comprising:
    means for displaying the vitality parameter;
    means for setting by the processor the damage as effective damage based on said value of the attack-power parameter; and
    means for setting the vitality parameter at a decreased level based on the effective damage after a prescribed delay time expires unless the decrease is cancelled in response to an input by the operation input means.

9. A non-transient computer-readable medium having computer-executable instructions that upon execution of the code by a game apparatus including a processor, a memory, and operation input means, perform a game processing method in which a player character that acts in response to a player operation and an enemy character attack each other, a vitality parameter set for the player character is decreased in accordance with damage given to the player character when the enemy character makes an attack on the player character, the game processing method comprising:
    setting by the processor the damage as ineffective damage or effective damage based on a value of an attack-power parameter of a weapon used in the attack by the enemy character;
    storing by the processor an amount of said ineffective damage into the memory when the player character is given the ineffective damage;
    restoring by the processor the amount of ineffective damage stored in the memory to one decreased by a predetermined amount as time elapses after the player character is given the ineffective damage;
    calculating by the processor, if the player character is given effective damage while the amount of ineffective damage is stored in the memory, a total amount of damage that includes an amount of effective damage based on the effective damage and the amount of ineffective damage in the memory, and decreasing by the processor the vitality parameter of the player character based on the amount of damage;
    setting the attack-power parameter for the attack, wherein said setting the damage sets the damage as the effective damage or the ineffective damage based on the attack-power parameter;
    generating by the processor one or more points for the player character for each successful attack on the enemy character by the player character; and
    changing by the processor, when an accumulation of points teaches a predetermined amount, a state of the player character in which all damage incurred by the player character during a predetermined period of a remainder of a current game is set as ineffective damage regardless of the attack-power parameter value.

10. The non-transient computer-readable medium according to claim 9, in which the game processing method further comprises:
   displaying the vitality parameter;
   setting by the processor the damage as effective damage based on said value of the attack-power parameter; and
   setting by the processor the vitality parameter at a decreased level based on the effective damage after a prescribed delay time expires unless the decrease is cancelled in response to an input by the operation input means.

\* \* \* \* \*